US005428511A

United States Patent [19]
Luallin et al.

[11] Patent Number: 5,428,511
[45] Date of Patent: Jun. 27, 1995

[54] QUICK RELEASE VEHICLE HEADLAMP ARRANGEMENT

[75] Inventors: John M. Luallin, Anderson; Steven V. Horsman, Indianapolis; Jan A. Wisler; Brian E. Witte, both of Anderson, all of Ind.

[73] Assignee: General Motors Corporation, Detroit, Mich.

[21] Appl. No.: 314,742

[22] Filed: Sep. 29, 1994

[51] Int. Cl.⁶ ............................................. F21M 3/18
[52] U.S. Cl. ................................... 362/66; 362/287; 362/419; 362/428
[58] Field of Search ................... 362/66, 80, 285, 287, 362/418, 419, 427, 428

[56] References Cited

U.S. PATENT DOCUMENTS

| | | | |
|---|---|---|---|
| 4,870,544 | 9/1989 | Iwameto | 362/66 |
| 4,894,754 | 1/1990 | Levilain | 362/66 |
| 4,901,208 | 2/1990 | DePetro | 362/419 |
| 4,947,306 | 8/1990 | O'Shaughnessey | 362/64 |
| 4,974,123 | 11/1990 | Leeallin et al. | 362/66 |
| 5,270,907 | 12/1983 | Lisak | 362/66 |

Primary Examiner—Richard R. Cole
Attorney, Agent, or Firm—Ernest E. Helms

[57] ABSTRACT

An arrangement of an aimable vehicle headlamp assembly connected to a panel of an automotive vehicle is provided including in a preferred embodiment a bulb; a reflector housing mounting the bulb; at least one rod connecting to the panel of the vehicle and projecting therefrom with a balled end; a longitudinal channel connected to the reflector housing facing the panel of the vehicle, the channel having a forward wall having a depression, and the channel having side walls with converging flange portions spaced from the forward wall with a slotted region between the flanges; and a slider with a top tab, the slider being slidably mounted in the channel and captured by the forward wall, side walls and flanges, the slider having an elongated aperture having a first diameter larger than the rod ball and a second diameter smaller than the rod ball wherein to connect the reflector housing to the panel of the vehicle, the ball of the rod being generally aligned with the channel depression through the slot region in the channel, and thereafter the slider is moved downward.

7 Claims, 3 Drawing Sheets

QUICK RELEASE VEHICLE HEADLAMP ARRANGEMENT

FIELD OF THE INVENTION

The field of the present invention is that of vehicle headlamp assemblies for automotive vehicles, particularly composite-type headlamp assemblies having replaceable bulbs.

BACKGROUND OF THE INVENTION

Many modern vehicular headlamps with aerodynamic styling provide for smaller lenses and replaceable halogen bulbs. The replaceable bulb arrangement permits the lens and reflector housing to remain in place on the vehicle and only requires that the smaller halogen bulb be replaced should a bulb burn out and require servicing. Most replaceable bulb headlamps provide for room behind the headlamp for bulb servicing. When the bulb burns out, room for a hand must be provided to remove the old bulb and for insertion of the replacement bulb. The servicing requirement often results in access holes in the support panels or extra room being provided for access from the top of the headlamp after a vehicle hood is raised.

Many newer vehicle stylings have smaller hoods, with the headlamp being placed under the fender panel, restricting service access. To attach a reflector housing to a panel connected to the vehicle, many headlamp assemblies are provided with special attaching screws that must be removed to release the headlamp for servicing. It is desirable to provide a headlamp attaching system that does not require the utilization of special tools and which ensures continued proper aim of the headlamp assembly, does not require hand access directly behind the reflector housing and is safe and easy for servicing, allowing a vehicle owner to service the headlamp without resorting to a mechanic or dealer repair specialist. Additionally, the attachment system should allow a minimum space requirement, thereby minimizing weight and maximizing positive aerodynamic capabilities to enhance the environmental efficiency of the vehicle.

SUMMARY OF THE INVENTION

The present meets the above-noted needs by providing a headlamp assembly which can be connected to or removed from a fixed panel in the vehicle by simply raising or lowering a slider connected within a channel fixed to the reflector housing.

Additional advantages of the present invention will be apparent to those skilled in the art as the invention is revealed in the accompanying drawings and detailed description.

DESCRIPTION OF THE PREFERRED

Figure 1:
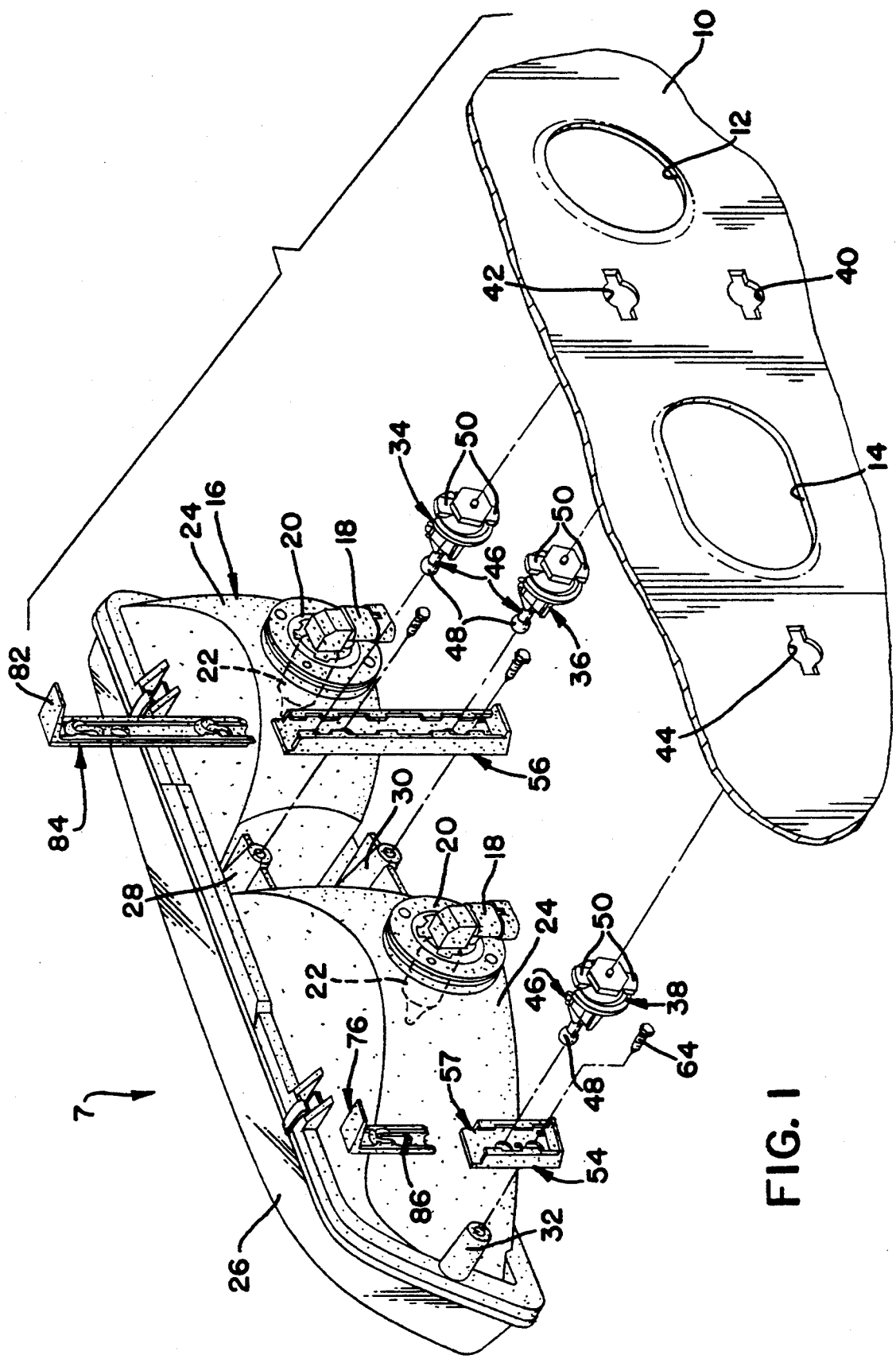
FIG. 1 is an exploded view of a headlamp arrangement according to the present invention.
Figure 2:
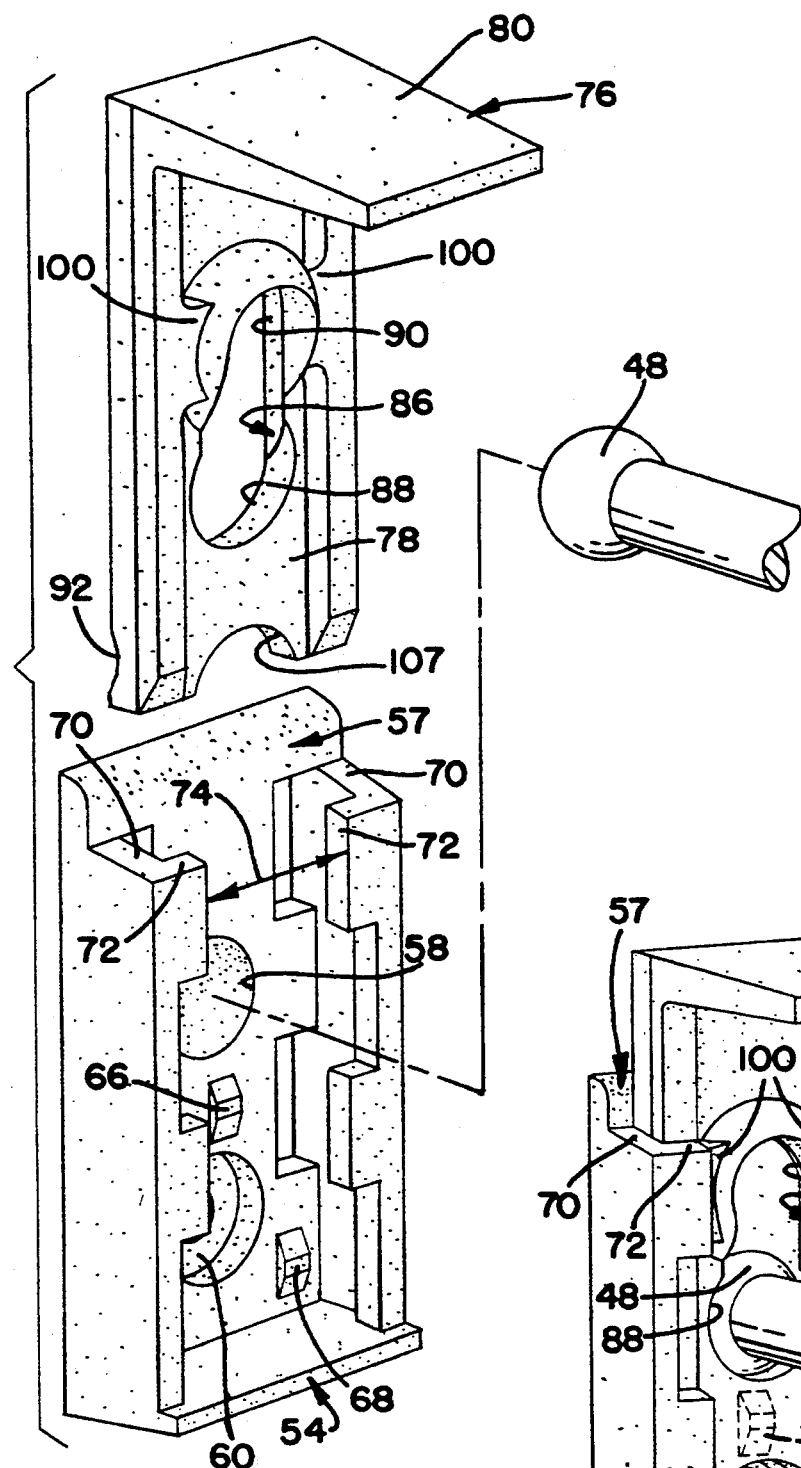
FIG. 2 is an enlarged view of the channel, slider and rod of the present invention with the slider removed from the channel.

Referring to FIG. 1, the vehicle headlamp arrangement 7 of the present invention has fixably connected to the vehicle a panel 10. Panel 10 may be a structural component of the vehicle or optionally may be a panel connected to a structural component. Panel 10 has two optional apertures 12 and 14 which allow a reflector housing assembly 16 to be so adjacent to the panel 10 that a bulb holder 18 (sometimes referred to as a part of the "bulb") and retainer 20 may protrude through the apertures 12 and 14 if so desired. However, not shown would be a portion of the vehicle extending over panel 10 or adjacent to panel 10 such that hand access to the bulb holder 18 would not be normally possible (assuming that the maximum space-saving attributes of the invention are intended to be utilized in the vehicle). In another embodiment, the apertures 12 and 14 on panel 10 may be eliminated.

The reflector housing 16 as shown is for a dual lamp headlamp assembly having electrical light bulbs 22 (shown in hidden line). The bulbs 22 provide a source of illumination and are connected to the bulb holder 18, which is typically of the twist or bayonet type which twists in for assembly or removal. However, the present invention is not limited to such assemblies. The reflector housing in the arrangement 7 has two parabolic reflector surfaces 24 and a connected lens 26. In an alternative embodiment not shown, the lens 26 is not connected to the reflector housing but is directly connected to a sealed envelope provided in the sheet metal of the vehicle (which surrounds the reflector housing). The reflector housing has mounting bosses 28, 30 and 32. The boss 30 is associated with a fixed pivoting connector assembly, the boss 28 is associated with a vertical adjuster being in line with the boss 30, and the boss 32 is associated with a horizontal adjuster. The fixed pivoting connector has an adjuster mount 36 having a quarter turn connection with panel 10 through a keyed aperture 40. In like manner, adjuster mount 34 is associated with aperture 42 and adjuster mount 38 is associated with aperture 44. Each mount has a rod 46 threaded therein with an associated ball 48 on an end adjacent the reflector housing 16. The adjuster mounts 34, 36, 38 are attached to the panel 10 by insertion of their wings 50 and making a quarter turn to lock them in position. This is one example of many different adjustment mechanisms which will function in this application.

A single channel 54 is provided in association with boss 32, and a longer channel 56 is provided in association with bosses 30 and 28. The operation of channels 54 and 56 and their associated sliders is essentially identical; therefore, in the interest of brevity, only the operation of channel 54 and its associated slider will be explained.

Referring additionally to FIGS. 2 through 5, channel 54 has a forward wall 57 on its end most adjacent to the housing boss 32. Forward wall 57 has a semispherical depression 58 and a bolt housing 60 (best shown in FIG. 5) with a bore 62 to facilitate the attachment of the channel 54 to the boss 32 by a bolt 64. The forward wall 57 also has an upper detent ramp member 66 and two lower detent ramp members 68. The channel 54 has two opposing sides 70. Each side 70 has facing flanges 72 which are generally parallel spaced from the forward wall 57. A slot region or spacing 74 exists between the two flanges 72. The channel is typically a polymeric material such as glass-filled nylon.

Mounted for sliding movement within the channel 54 between the forward wall 57, side walls 70 and flanges 72 is a slider 76. The slider 76 is typically made from the same material as the channel. The slider 76 has a main body 78 joined to a tab portion 80. In an alternative embodiment not shown, the tab 80 with slider 76 may be solidly joined with a tab 82 of a slider 84 associated with channel 56 (see FIG. 1) so that both sliders can be moved simultaneously if so desired. The slider main body 78 as explained previously slides within the channel and has a slight interference fit. The slider has a generally elongated aperture 86 having a first large diameter 88 greater than the diameter of the ball 48 and a second smaller diameter 90 which is smaller than the diameter of ball 48. The slider has two grooved surfaces 92 for interaction with the lower detents 68 in a manner to be explained later. Additionally, the slider also has an impression 94 (best shown in FIG. 5) matching the contour and shape of the upper detent 66 of the channel.

Figure 3:
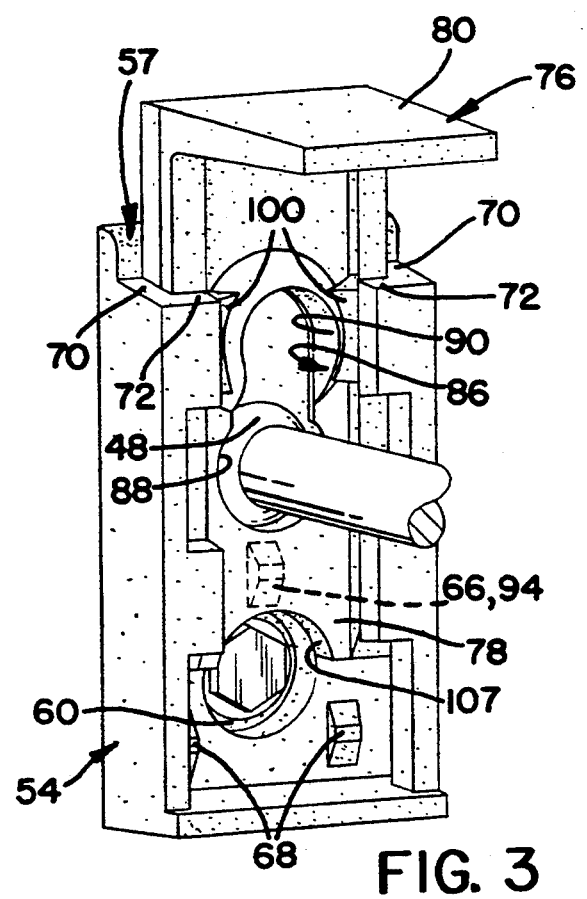
FIG. 3 is an assembled view of the channel and slider shown in FIG. 2 with the slider positioned for insertion of the rod ball end into the channel.
Figure 4:
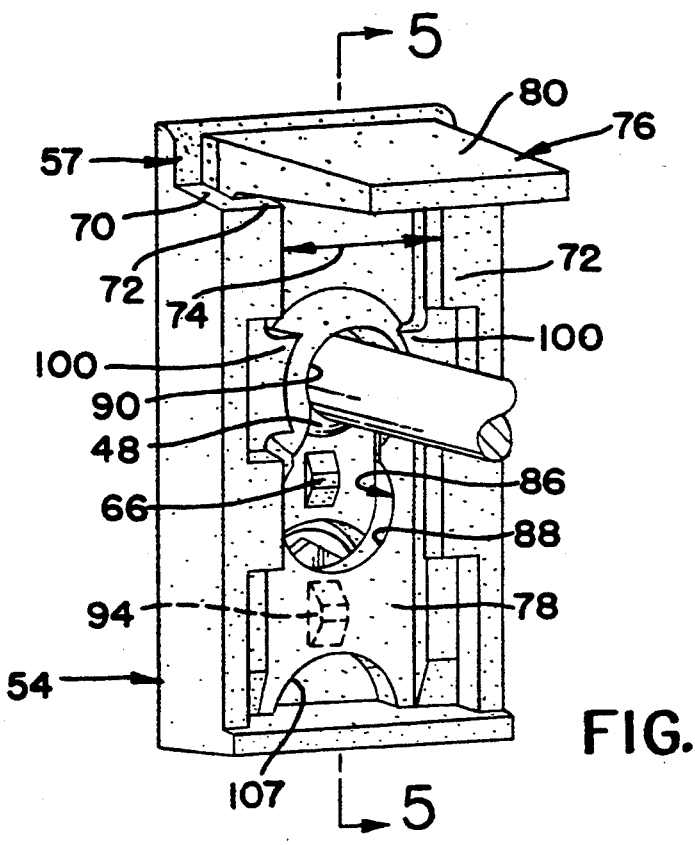
FIG. 4 is a perspective view of the slider being pushed down to connect the reflector housing with the rod.
Figure 5:
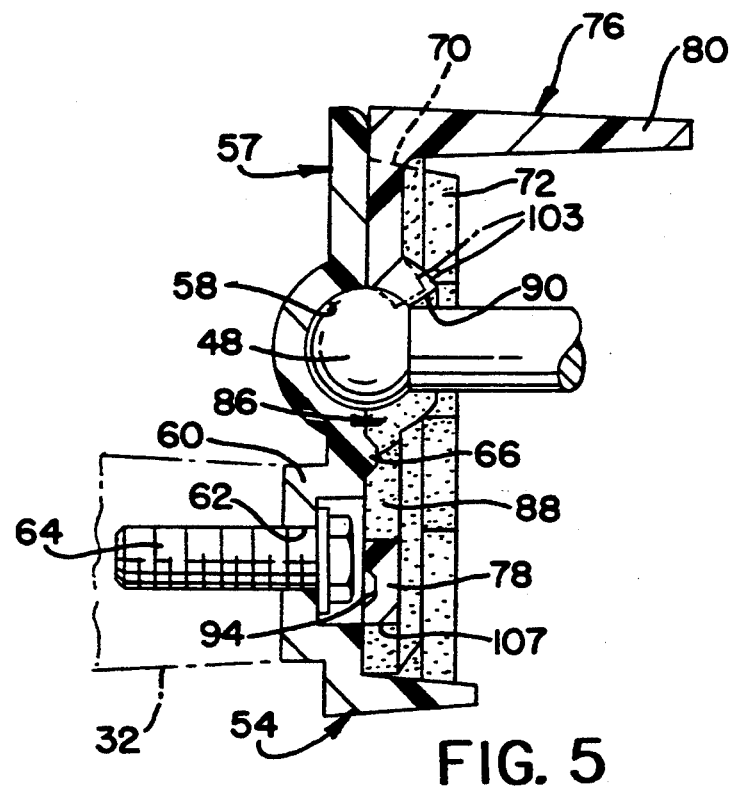
FIG. 5 is a view taken along line 5—5 of FIG. 4.

To attach the reflector housing 16 (adjuster mounts 34, 36 and 38 being previously attached to the panel 10), the reflector housing 16 is positioned to place the depression 58 in general alignment with the rod ball 48, as best shown in FIG. 3. The slider 76 is detented in the upward position by alignment of its depression 94 mating with the upper detent 66. This prevents the slider from being inadvertently pulled out when the ball 48 is removed. The ball 48 will pass through the second enlarged diameter 88. Thereafter, the vehicle operator will simply push down on tab 80, pushing the slide downward until the two detents 68 are captured by grooves 92 on the slider and the ball 48 is encapsulated within the smaller diameter 90. The smaller diameter 90 of a ring portion 103 of the slider is configured in such a way to make a slight interference fit on the ball 48 to ensure tightness of the connection. This interference aids in the prevention of removal of the ball and/or headlamp flutter resultant of vehicle vibration. Ribs 100 are provided to reinforce the slider 76 in the region of its interaction with the ball 48.

In addition to holding slider 76 snugly in place, the channel flanges 72 also support the slider 76 when the ball 48 is encapsulated in the down position.

Since the slider 76 and channel 54 are shipped as an assembly in a relative position as shown in FIG. 3, a semicircular groove 107 is provided on the slider 76 to provide access to the head of bolt 64.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An arrangement of an aimable vehicle headlamp assembly fixably connected to a fixed portion of a vehicle, the arrangement comprising:
    a bulb providing a source of illumination;
    a reflector housing mounting the bulb;
    at least one rod connecting to the fixed portion of the vehicle and projecting therefrom, the rod on an end most adjacent to the reflector housing having a ball end;
    a longitudinal channel fixably connected to the reflector housing on a side of the reflector housing facing the fixed portion of the vehicle, the channel having a forward wall generally adjacent the reflector housing, the forward wall having a depression, and the channel having side walls, at least one side wall having a flange portion spaced from the forward wall with a slotted region between the flange portion and the opposing wall; and
    a slider slidably mounted in the channel captured by the forward wall, side walls and flange, the slider having an elongated aperture having a first diameter larger than the rod ball and a second diameter smaller than the rod ball wherein to connect the reflector housing to the fixed portion of the vehicle, the rod ball being generally aligned with the channel forward wall depression through the first diameter of the slider, thereafter the slider is moved within the channel to capture the rod ball between the channel forward wall depression and the second diameter of the slider.

2. A vehicle headlamp arrangement as described in claim 1 wherein the slider is moved downward to capture the ball of the rod.

3. A vehicle headlamp arrangement as described in claim 2 wherein the slider is detented in a downward position after the slider has been moved downward to capture the ball of the rod.

4. A vehicle headlamp arrangement as described in claim 1 wherein the slider is detented in a position aligning the first diameter of the aperture with the depression of the channel forward wall.

5. A vehicle headlamp arrangement as described in claim 1 wherein the channel is made from a polymeric material and the slider has a slight interference fit with the polymeric material.

6. A vehicle headlamp arrangement as described in claim 1 further including the channel having two linearly spaced depressions and the slider having two elongated apertures and wherein movement of the slider connects the headlamp assembly with the fixed portion of the vehicle in two space locations.

7. An arrangement of an aimable vehicle headlamp assembly fixably connected to a panel of an automotive vehicle, the arrangement comprising:
    a bulb providing a source of illumination;
    a reflector housing mounting the bulb;
    at least one rod connecting to the panel of the vehicle and projecting therefrom, the rod on an end most adjacent to the reflector housing having a ball end;
    a polymeric longitudinal channel fixably connected to the reflector housing on a side of the reflector housing facing the panel of the vehicle, the channel having a forward wall generally adjacent the reflector housing, the forward wall having a depression, and the channel having side walls with converging flange portions spaced from the forward wall with a slotted region between the flanges, and the channel having upper and lower detents; and
    a slider with a top tab, the slider being slidably mounted in the channel and captured by the forward wall, side walls and flanges, the slider having an elongated aperture having a first diameter larger than the rod ball and a second diameter smaller than the rod ball wherein to connect the reflector housing to the panel of the vehicle, the ball of the rod being generally aligned with the channel forward wall depression through the slot region in the channel and the first diameter in the slider, and thereafter the slider is moved downward from its detented up position to capture the rod ball between the channel forward wall depression and the second diameter of the slider and is detented in a downward position to resist upward movement of the slider.

* * * * *